(12) United States Patent
Chang et al.

(10) Patent No.: US 9,071,100 B2
(45) Date of Patent: Jun. 30, 2015

(54) CENTRIFUGAL HEAT DISSIPATION DEVICE AND MOTOR USING SAME

(71) Applicant: Asia Vital Components Co., Ltd., New Taipei (TW)

(72) Inventors: Shyy-Woei Chang, New Taipei (TW); Kuei-Feng Chiang, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 0 days.

(21) Appl. No.: 14/259,816

(22) Filed: Apr. 23, 2014

(65) Prior Publication Data

US 2014/0265669 A1    Sep. 18, 2014

Related U.S. Application Data

(62) Division of application No. 13/179,564, filed on Jul. 11, 2011.

(30) Foreign Application Priority Data

Mar. 29, 2011   (TW) .............................. 100110737 A
Mar. 29, 2011   (TW) .............................. 100205517 U

(51) Int. Cl.
*H02K 9/20*        (2006.01)
*F28D 15/02*       (2006.01)
*F28D 15/04*       (2006.01)
*H02K 1/32*        (2006.01)

(52) U.S. Cl.
CPC ............... *H02K 9/20* (2013.01); *F28F 2250/08* (2013.01); *F28D 15/0208* (2013.01); *F28D 15/0233* (2013.01); *F28D 15/0266* (2013.01); *F28D 15/0275* (2013.01); *F28D 15/046* (2013.01); *F28D 2015/0291* (2013.01); *H02K 1/32* (2013.01)

(58) Field of Classification Search
USPC ............................................. 310/61–64, 60 A
See application file for complete search history.

(56) References Cited

U.S. PATENT DOCUMENTS

| | | | | |
|---|---|---|---|---|
| 532,795 | A | * | 1/1895 | Lemp ............................ 310/265 |
| 890,577 | A | * | 6/1908 | Richards ......................... 310/65 |
| 3,914,630 | A | * | 10/1975 | Lloyd et al. ..................... 310/61 |
| 4,286,182 | A | * | 8/1981 | Lenz ............................... 310/61 |
| 4,322,646 | A | * | 3/1982 | Persson ........................... 310/64 |
| 4,331,895 | A | * | 5/1982 | Edick et al. .................... 310/61 |
| 6,191,511 | B1 | * | 2/2001 | Zysset ......................... 310/60 A |

(Continued)

*Primary Examiner* — Naishadh Desai
(74) *Attorney, Agent, or Firm* — C. G. Mersereau; Nikolai & Mersereau, P.A.

(57) ABSTRACT

A centrifugal heat dissipation device and a motor using same are disclosed. The centrifugal heat dissipation device includes a main body having a shaft hole, a heat-absorption zone and a heat-transfer zone. The heat-transfer zone has a radially outer side connected to the heat-absorption zone and a radially inner side connected to the shaft hole. The shaft hole axially extends through the main body for receiving a shaft of a motor therein. A centrifugal force generated by the rotating shaft and accordingly, the heat dissipation device enables enhanced vapor-liquid circulation of a working fluid in the heat dissipation device, so that heat generated by the operating motor is absorbed by the centrifugal heat dissipation device and transferred to the shaft for guiding out of the motor, allowing the motor to have largely upgraded heat dissipation performance.

8 Claims, 22 Drawing Sheets

(56) References Cited

U.S. PATENT DOCUMENTS

| | | | |
|---|---|---|---|
| 6,376,943 B1 * | 4/2002 | Gamble et al. | 310/52 |
| 6,727,609 B2 * | 4/2004 | Johnsen | 310/52 |
| 6,889,755 B2 * | 5/2005 | Zuo et al. | 165/104.26 |
| 7,156,195 B2 * | 1/2007 | Yamagishi et al. | 180/65.1 |
| 7,443,062 B2 * | 10/2008 | Dong et al. | 310/54 |
| 7,579,725 B2 * | 8/2009 | Zhou et al. | 310/61 |
| 2002/0153794 A1 * | 10/2002 | Kawasaki et al. | 310/156.08 |
| 2006/0066156 A1 * | 3/2006 | Dong et al. | 310/54 |

\* cited by examiner

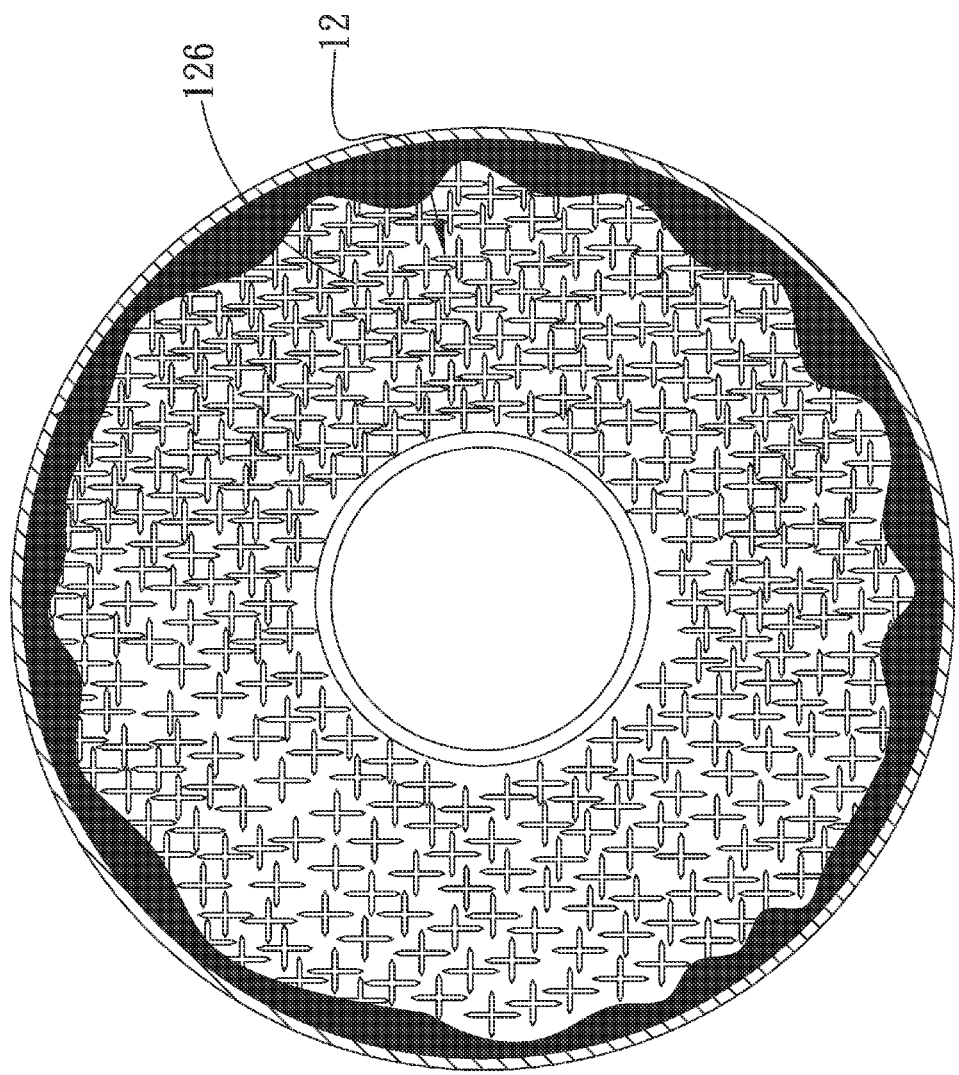

CENTRIFUGAL HEAT DISSIPATION DEVICE AND MOTOR USING SAME

CROSS-REFERENCE TO RELATED APPLICATIONS

The present application is a division of U.S. patent application Ser. No. 13/179,564, filed on Jul. 11, 2011, titled Centrifugal Heat Dissipation Device and Motor Using Same, listing Shvv-Woei Chang and Kuei-Feng Chiang as inventors. This application claims the priority benefit of Taiwan patent application number 100110737 filed on Mar. 29, 2011.

FIELD OF THE INVENTION

The present invention relates to a centrifugal heat dissipation device, and more particularly to a centrifugal heat dissipation device that rotates and utilizes a produced centrifugal force to enable enhanced vapor-liquid circulation of a working fluid filled therein. The present invention also relates to a motor that uses the above-described centrifugal heat dissipation device and therefore has largely upgraded heat dissipation performance.

BACKGROUND OF THE INVENTION

All the currently available motors, power generators, and various kinds of electric engines include a rotor and a stator. When a motor is excited due to the effect of stator-rotor mutual induction, the motor works or generates power. Heat will be generated when the silicon steel sheets provided on the rotor and the winding coils wound on the silicon steel sheets are supplied with an electric current. The hysteresis loss (iron loss) and copper loss of the rotor would generate thermal power, which causes increased temperature and lowered efficiency of the motor rotor, and thereby limits the maximum power of the rotary motor.

A motor usually has an efficiency of 85%. The 15% loss of the motor would cause heat transfer among the motor windings, the motor stator and/or the motor housing. When operating under atmospheric pressure, the heat generated by the motor rotor is transferred to the motor housing mainly via convection. That is, the heat generated by the motor rotor is transferred to the motor housing with the air inside the motor as the heat transfer medium. By providing the motor rotor with radiating fins to cool the motor, the effect of heat transfer via convection can be maximized.

It is also possible to transfer part of the thermal loss power of the motor or the power generator to an external environment through heat conduction and radiation via the rotary shaft and bearings of the motor or the power generator. However, this type of heat transfer mechanism can only provide relatively small cooling effect. When a high-speed shaft and a thermal rotor operate in a high-temperature condition, the rotor must be cooled. Otherwise, the rotor rotating at high load is subject to burnout due to the thermal power generated by the hysteresis loss (iron loss) and copper loss.

The currently cooling systems available for motors and power generators are mainly designed to carry heat away from the stator. As to the rotor, it could not be effectively cooled since there has not been any effective heat dissipation means for rotor up to date.

In brief, the prior art motors or power generators have the following disadvantages: (1) the hysteresis loss and copper loss of the rotor thereof generates thermal power to result in increased rotor temperature and limited motor power; (2) heat tends to accumulate in the rotor; and (3) the rotor has low cooling performance.

SUMMARY OF THE INVENTION

A primary object of the present invention is to provide a centrifugal heat dissipation device that utilizes a centrifugal force to enable enhanced vapor-liquid circulation of a working fluid filled therein, so as to provide increased heat dissipation effect.

Another object of the present invention is to provide a motor with centrifugal heat dissipation device.

To achieve the above and other objects, the centrifugal heat dissipation device according to the present invention includes a main body having a shaft hole, a heat-absorption zone, and a heat-transfer zone. The heat-transfer zone has a radially inner side connected to the shaft hole and a radially outer side connected to the heat-absorption zone; and the shaft hole axially extends through the main body.

To achieve the above and other objects, the motor with centrifugal heat dissipation device according to an embodiment of the present invention includes at least one shaft, a centrifugal heat dissipation device, a plurality of silicon steel sheets, and a housing. The shaft internally defines a hollow space, and has a first end and an opposite second end communicating with the hollow space. The centrifugal heat dissipation device includes a main body having a shaft hole, a heat-absorption zone, and a heat-transfer zone. The heat-transfer zone has a radially inner side connected to the shaft hole and a radially outer side connected to the heat-absorption zone; and the shaft hole axially extends through the main body for receiving the shaft therein. The silicon steel sheets are externally fitted around the main body of the centrifugal heat dissipation device. The housing is internally provided with a magnetic member, which is located corresponding to but spaced from the silicon steel sheets when the centrifugal heat dissipation device and the shaft are mounted in the housing. The housing has at least one end being an open end, to which a cap is connected to close the housing.

To achieve the above and other objects, the motor with centrifugal heat dissipation device according to another embodiment of the present invention includes at least one shaft, a centrifugal heat dissipation device, at least one magnetic member, and a housing. The shaft internally defines a hollow space, and has a first end and an opposite second end communicating with the hollow space. The centrifugal heat dissipation device includes a main body having a shaft hole, a heat-absorption zone, and a heat-transfer zone. The heat-transfer zone has a radially inner side connected to the shaft hole and a radially outer side connected to the heat-absorption zone; and the shaft hole axially extends through the main body for receiving the shaft therein. The magnetic member is externally fitted around the main body of the centrifugal heat dissipation device. The housing is internally provided with a plurality of silicon steel sheets, which are located corresponding to but spaced from the magnetic member when the centrifugal heat dissipation device and the shaft are mounted in the housing. The housing has at least one end being an open end, to which a cap is connected to close the housing.

When the centrifugal heat dissipation device rotates along with the shaft of the motor, a centrifugal force is produced. The centrifugal force enables enhanced vapor-liquid circulation of a working fluid filled in the heat-absorption zone of the main body of the centrifugal heat dissipation device, so that heat generated by the operating motor is absorbed by the centrifugal heat dissipation device and transferred to the shaft} for guiding out of the motor, allowing the motor to have largely upgraded heat dissipation performance.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 4 is a cross sectional view of a third embodiment of the centrifugal heat dissipation device according to the present invention;

DETAILED DESCRIPTION OF THE PREFERRED EMBODIMENTS

Figure 1:
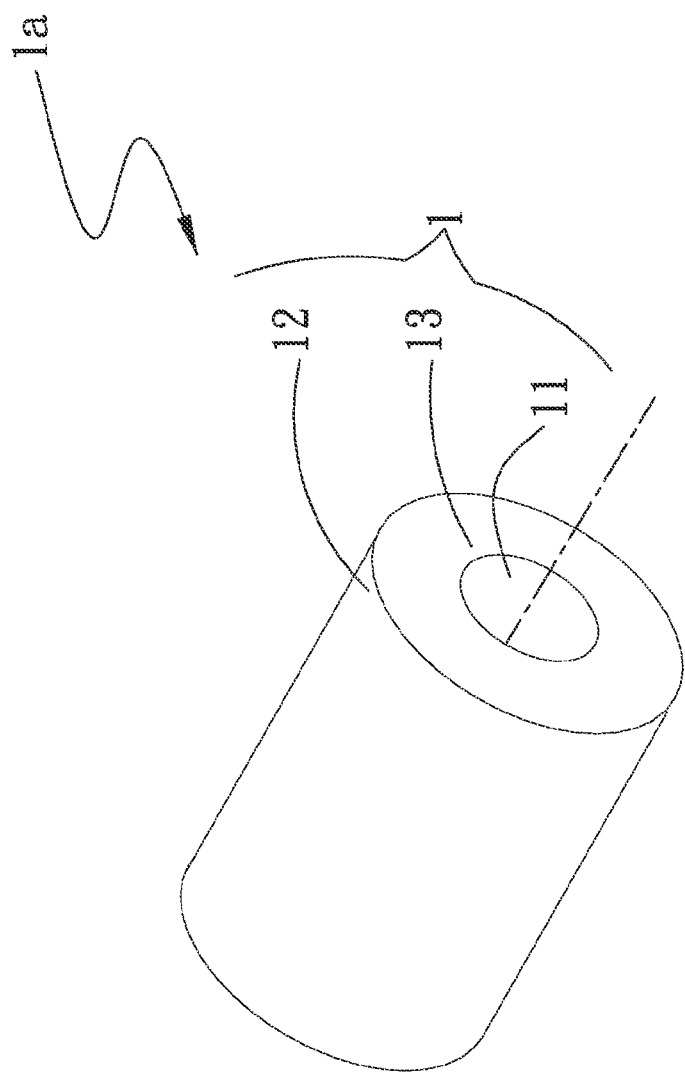
FIG. 1 is a perspective view of a first embodiment of a centrifugal heat dissipation device according to the present invention.

The present invention will now be described with some preferred embodiments thereof and with reference to the accompanying drawings. For the purpose of easy to understand, elements that are the same in the preferred embodiments are denoted by the same reference numerals.

Figure 2:
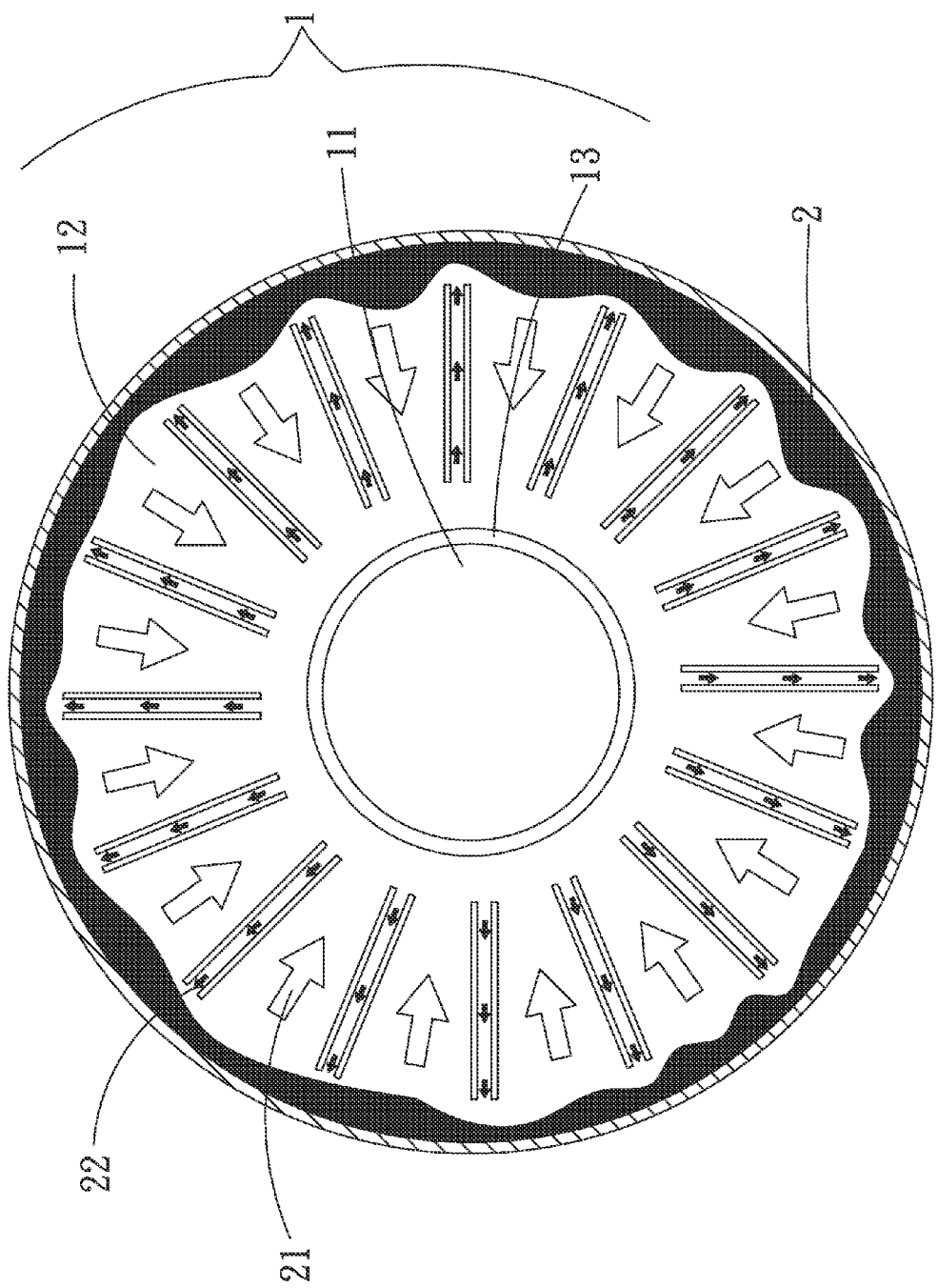
FIG. 2 is a cross sectional view of FIG. 1.

Please refer to FIGS. 1 and 2 that are assembled perspective view and cross sectional view, respectively, of a first embodiment of a centrifugal heat dissipation device 1a according to the present invention. As shown, the centrifugal heat dissipation device 1a in the first embodiment includes a cylindrical main body 1 having a shaft hole 11, a heat-absorption zone 12, and a heat-transfer zone 13. The heat-transfer zone 13 has a radially outer side connected to the heat-absorption zone 12 and a radially inner side connected to the shaft hole 11. The shaft hole 11 axially extends through the main body 1.

The heat-absorption zone 12 is internally provided with a working fluid 2.

Figure 3A:
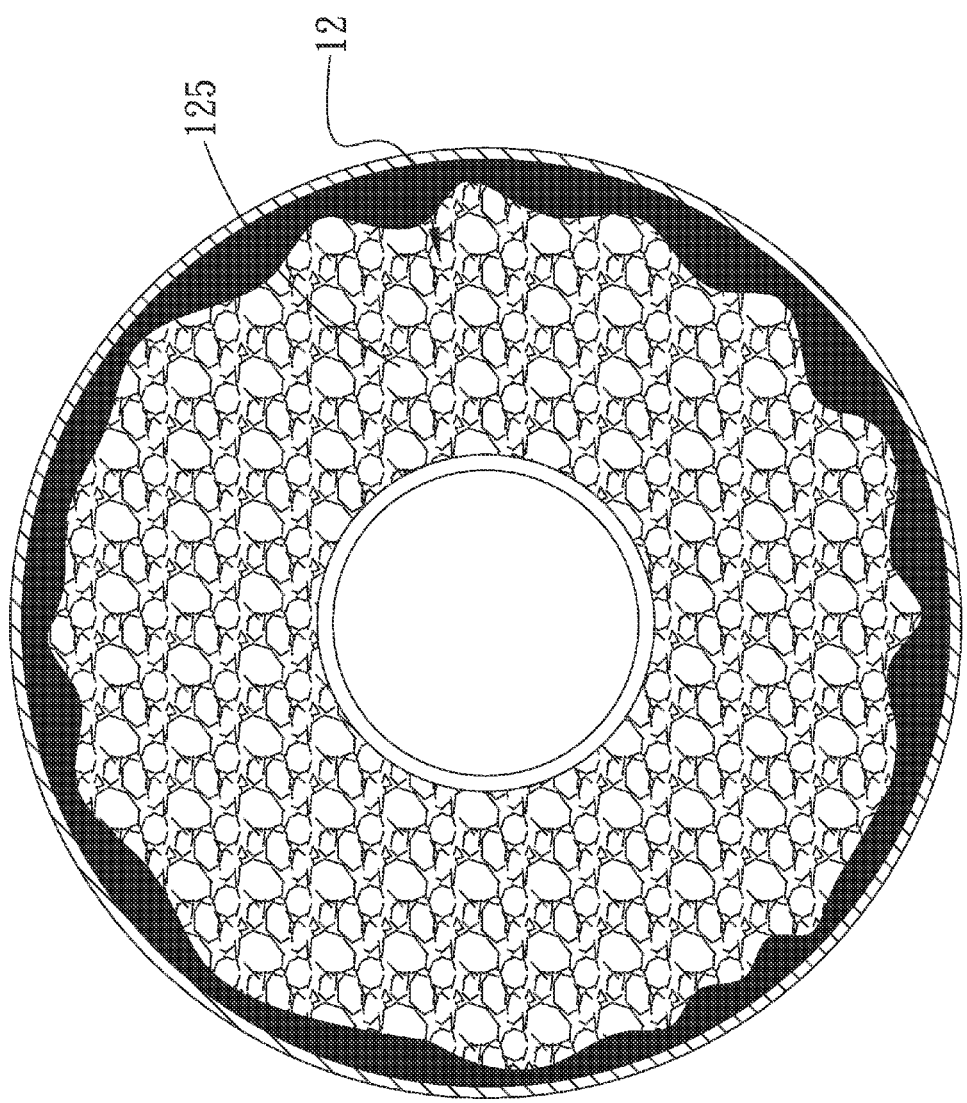
FIG. 3a is a cross sectional view of a second embodiment of the centrifugal heat dissipation device according to the present invention.
Figure 3B:
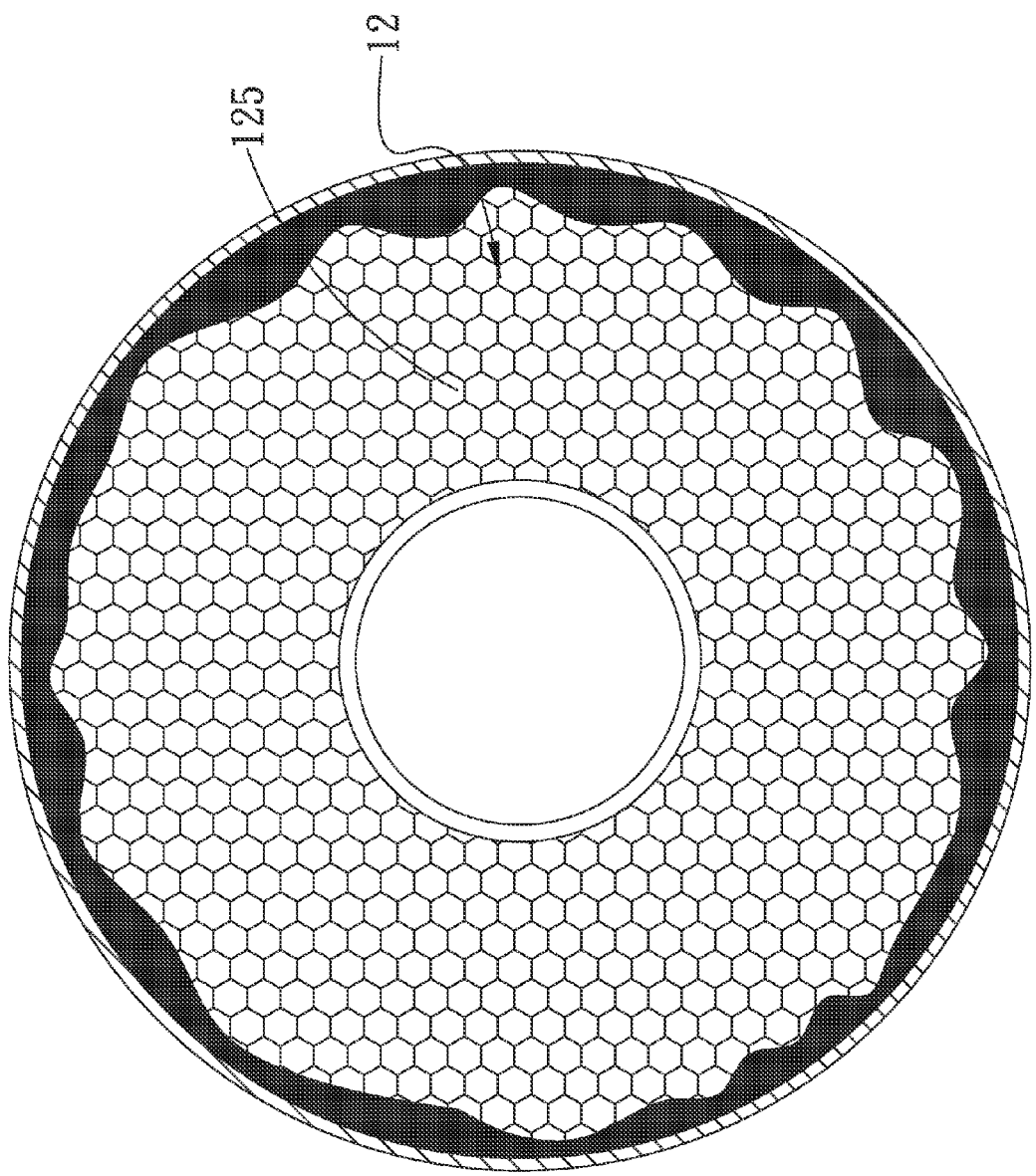
FIG. 3b is a cross sectional view of a variant of the second embodiment of the centrifugal heat dissipation device according to the present invention.

Please refer to FIG. 3a that is a cross sectional view of a second embodiment of the centrifugal heat dissipation device 1a according to the present invention, and to FIG. 3b that is a cross sectional view of a variant of the second embodiment of the centrifugal heat dissipation device 1a. As can be seen from FIGS. 3a and 3b, the centrifugal heat dissipation device 1a in the second embodiment and the variant thereof are generally structurally similar to the first embodiment, except for a wick structure 125 that is further provided in the heat-absorption zone 12. The wick structure 125 may be a sintered powder structure as shown in FIG. 3a, or a net-like structure as shown in FIG. 3b, or include a plurality of continuous or discontinuous grooves (not shown), or be any combination of the previous structures.

FIG. 4 is a cross sectional view of a third embodiment of the centrifugal heat dissipation device according to the present invention. As shown, the third embodiment is generally structurally similar to the first embodiment, except for a plurality of recesses 126 formed in the heat-absorption zone 12.

Figure 5:
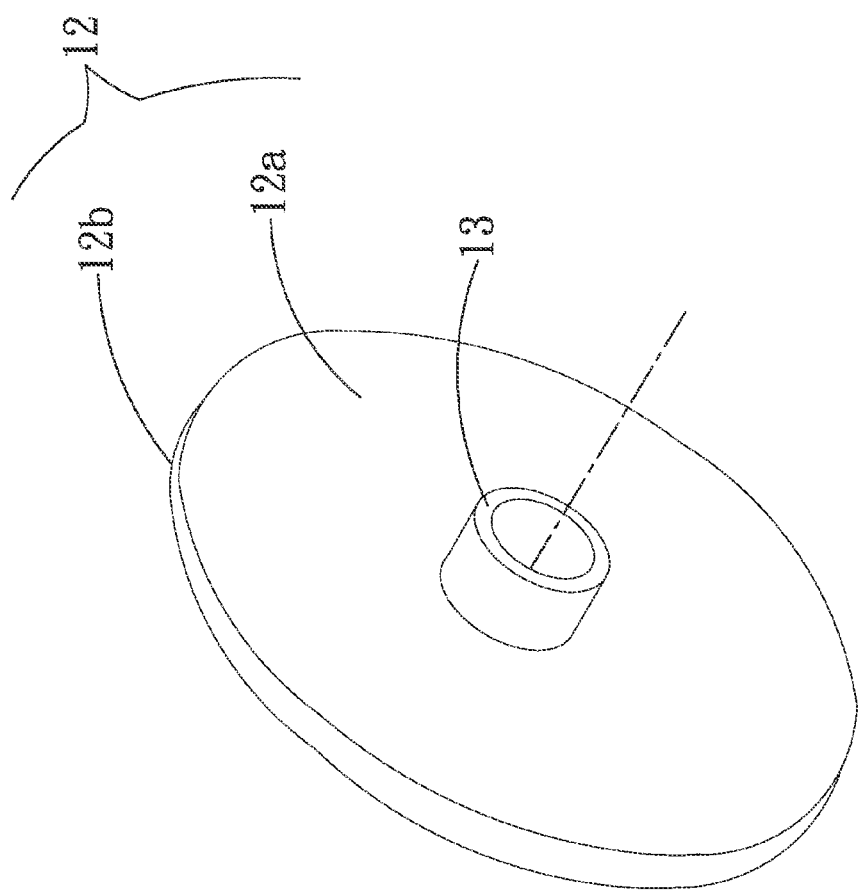
FIG. 5 is a perspective view of a fourth embodiment of the centrifugal heat dissipation device according to the present invention.

FIG. 5 is a perspective view of a fourth embodiment of the centrifugal heat dissipation device according to the present invention. The fourth embodiment is generally structurally similar to the first embodiment, except that the heat-absorption zone 12 is radially outward extended from only a partial axial length of the heat-transfer zone 13 and has a first transverse surface 12a and an opposite second transverse surface 12b.

Figure 6:
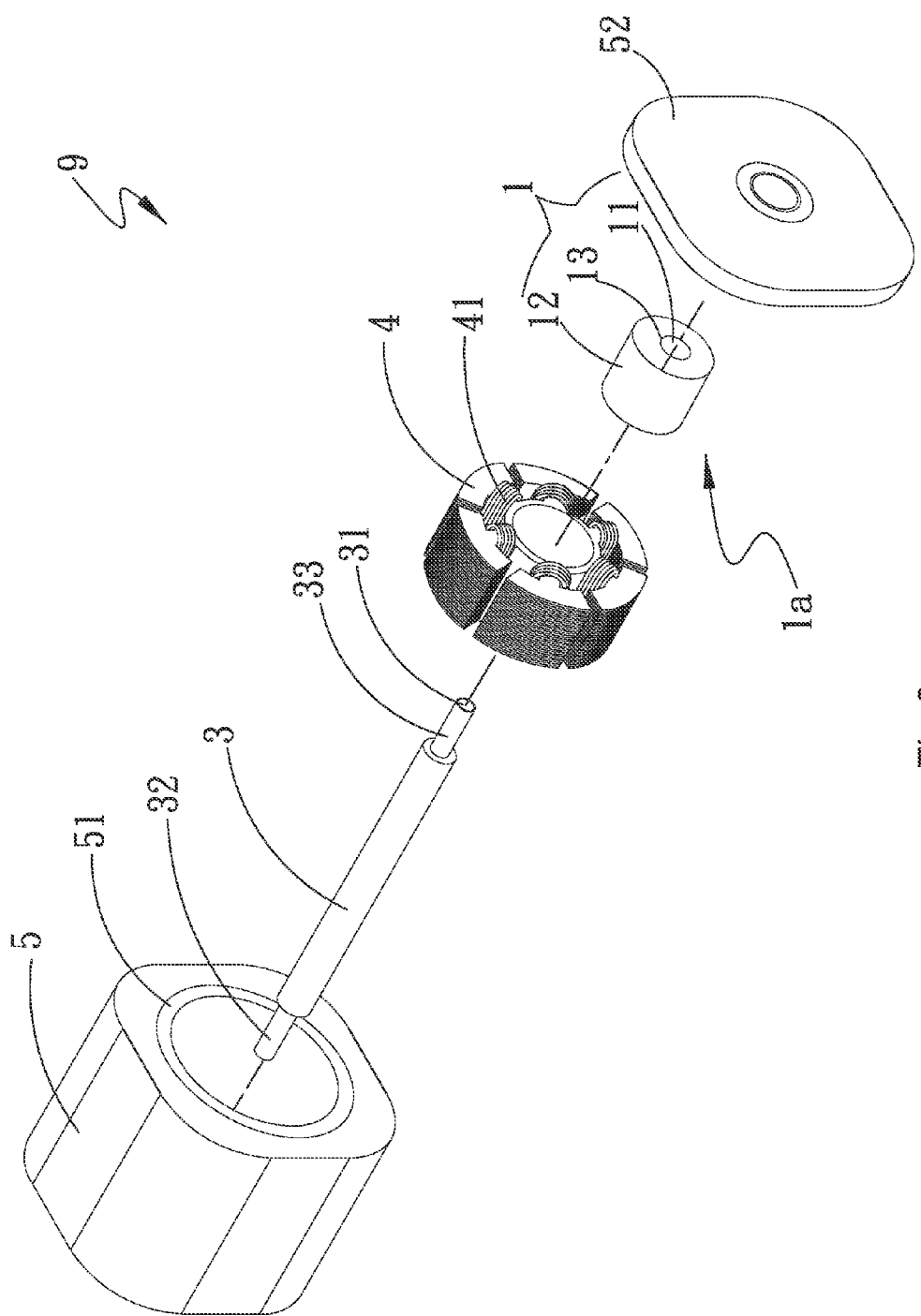
FIG. 6 is an exploded perspective view of a first embodiment of a motor with centrifugal heat dissipation device according to the present invention.
Figure 7:
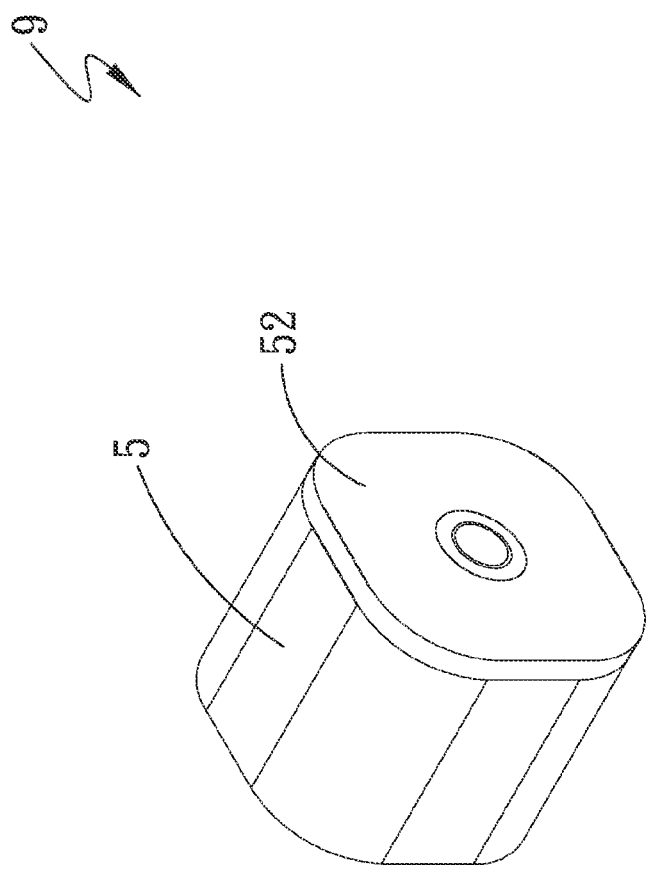
FIG. 7 is an assembled view of FIG. 6.
Figure 8:
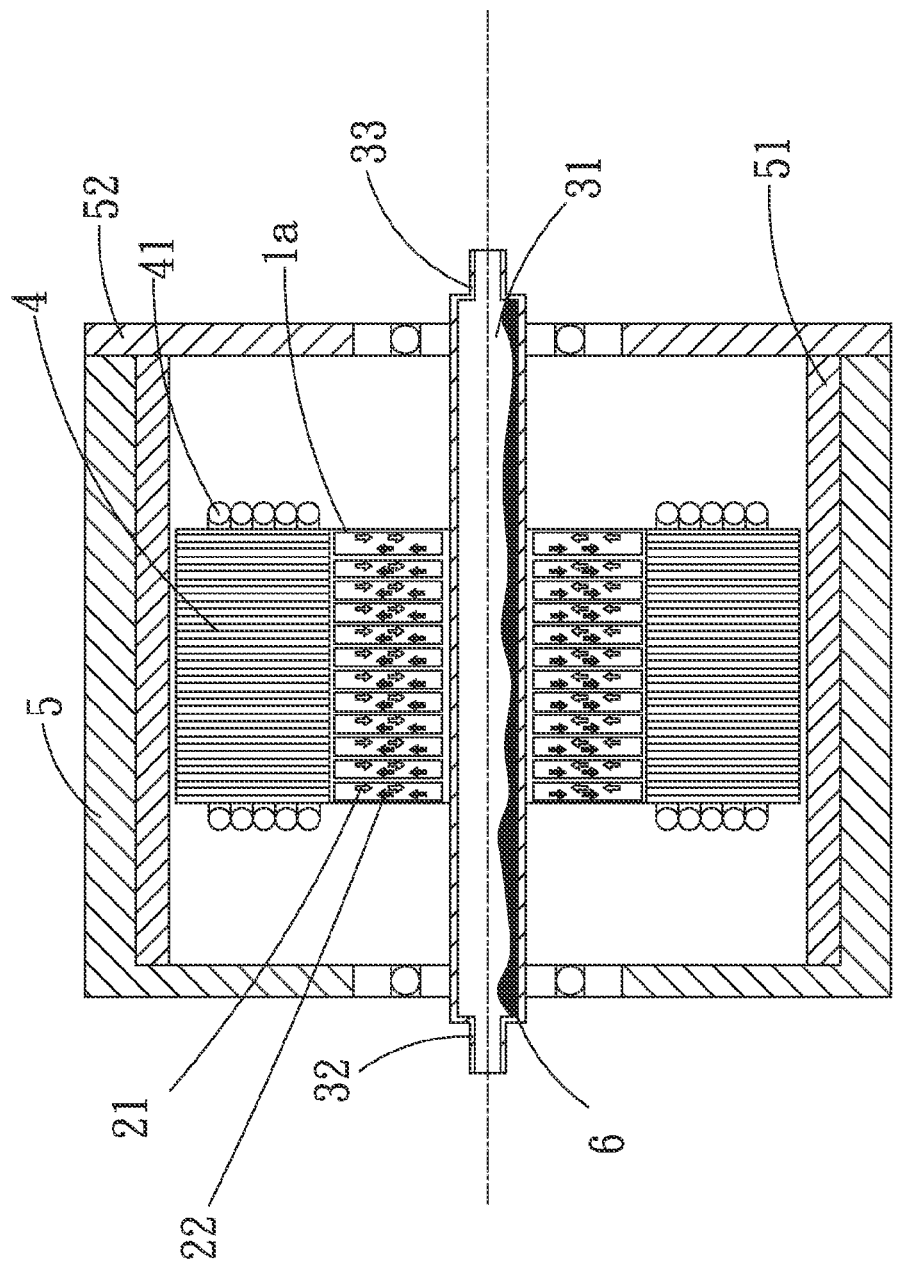
FIG. 8 is an assembled longitudinal sectional view of the motor of FIG. 6.

The present invention also relates to a motor 9 with centrifugal heat dissipation device. Please refer to FIGS. 6, 7 and 8, in which a first embodiment of the motor 9 with centrifugal heat dissipation device according to the present invention is shown. As shown, the motor 9 in the first embodiment thereof includes at least one shaft 3, a centrifugal heat dissipation device 1a, a plurality of silicon steel sheets 4, and a housing 5.

The shaft 3 internally defines a hollow space 31 and has a first end 32 and an opposite second end 33. The first and the second end 32, 33 are communicable with the hollow space 31.

The centrifugal heat dissipation device 1a includes a cylindrical main body 1, which includes a shaft hole 11, a heat-absorption zone 12, and a heat-transfer zone 13. The heat-transfer zone 13 has a radially inner side connected to the shaft hole 11 and a radially outer side connected to the heat-absorption zone 12. The shaft hole 11 axially extends through the main body 1, and the shaft 3 is fitted in the shaft hole 11.

The silicon steel sheets 4 are externally fitted around the main body 1 of the centrifugal heat dissipation device 1a.

The housing 5 is internally provided with a magnetic member 51, which is located corresponding to but spaced from the silicon steel sheets 4 when the centrifugal heat dissipation device 1a and the shaft 3 are mounted in the housing 5. The housing 5 has at least one end being an open end, to which a cap 52 is connected to close the housing 5. In a preferred embodiment, the magnetic member 51 is a magnet.

A cooling fluid 6 is filled in the hollow space 31 of the shaft 3. The cooling fluid 6 may be air, oil, or water.

The silicon steel sheets 4 have a plurality of winding coils 41 externally wound thereon.

Figure 9:
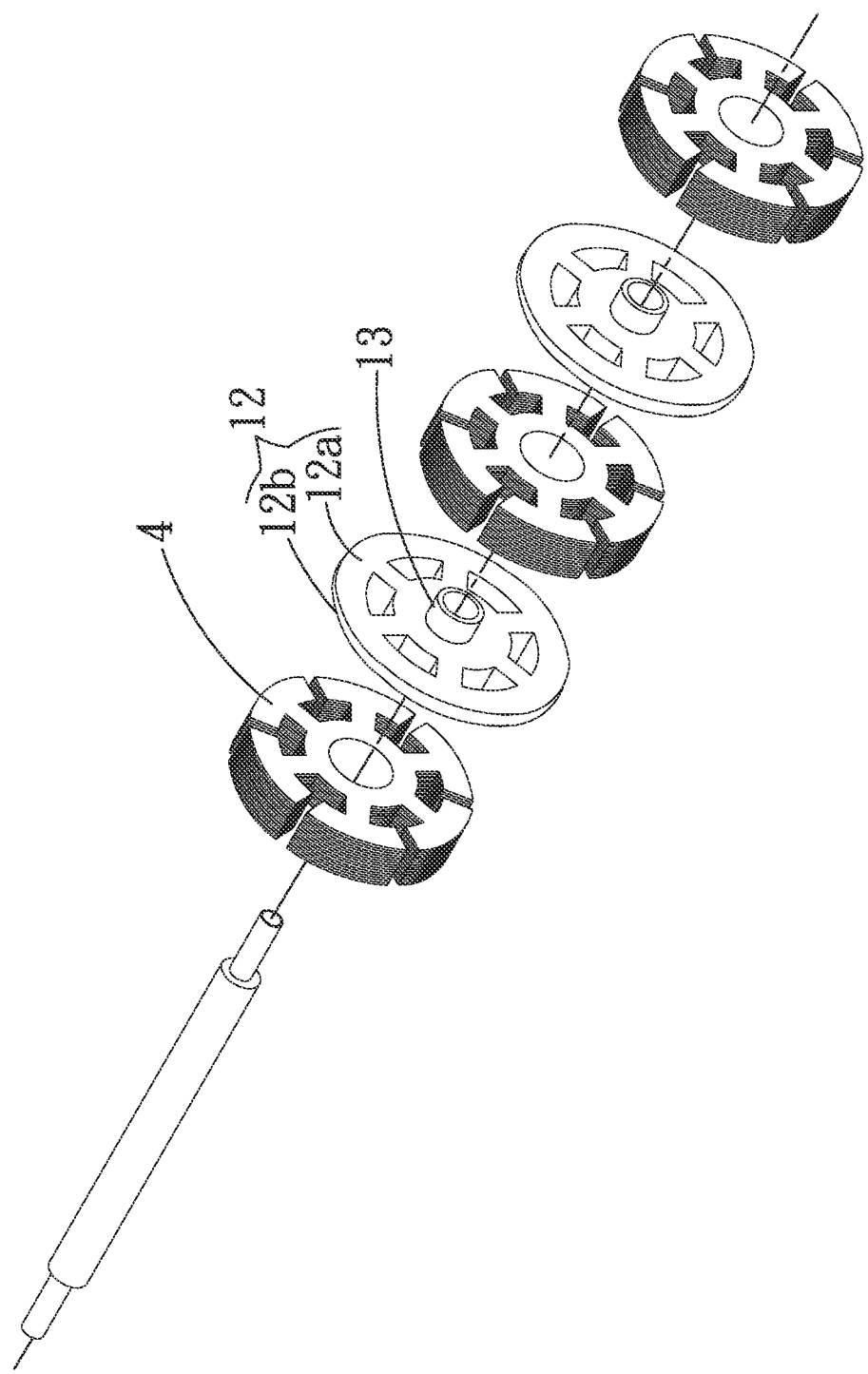
FIG. 9 is an exploded perspective view of a second embodiment of the motor with centrifugal heat dissipation device according to the present invention without showing the housing thereof.

Please refer to FIG. 9 that is an exploded perspective view of a second embodiment of the motor according to the present invention without showing the housing thereof. As shown, the motor in the second embodiment is generally structurally similar to the first embodiment, except that the centrifugal heat dissipation device for the second embodiment has a heat-absorption zone 12 that is radially outward extended from only a partial axial length of the heat-transfer zone 13 and has a first transverse surface 12a and an opposite second transverse surface 12b, and the silicon steel sheets 4 are in contact with the first or the second transverse surface 12a, 12b of the heat-absorption zone 12 of the centrifugal heat dissipation device.

Figure 10:
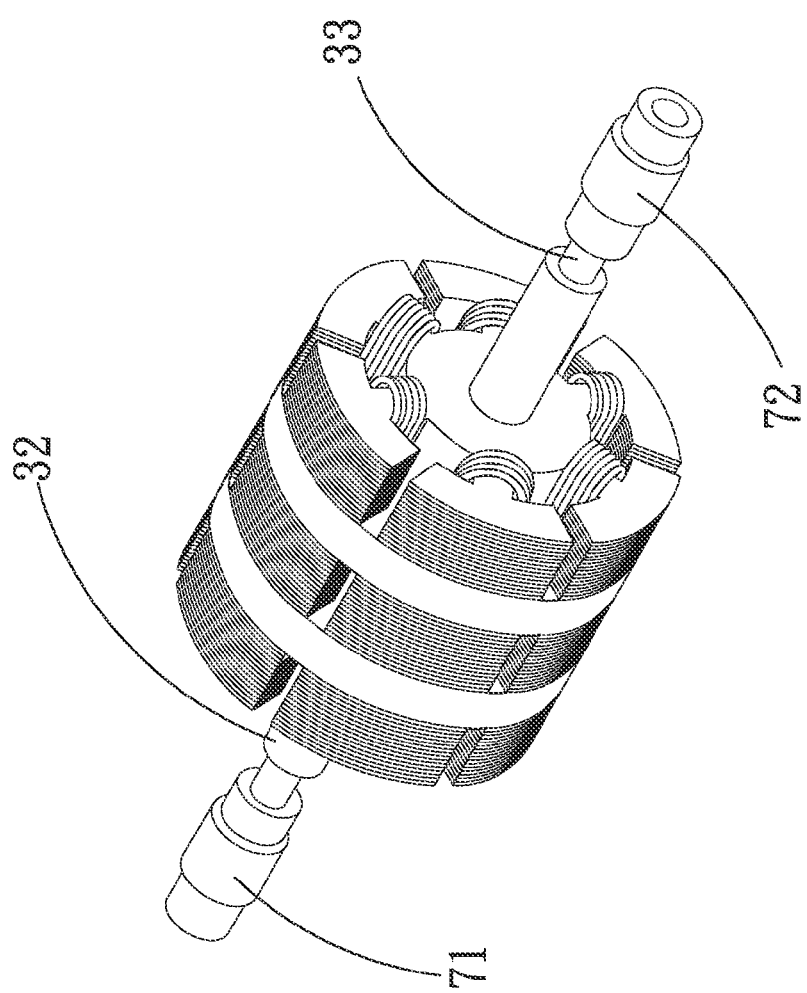
FIG. 10 is an assembled perspective view of a third embodiment of the motor with centrifugal heat dissipation device according to the present invention without showing the housing thereof.

FIG. 10 is an assembled perspective view of a third embodiment of the motor according to the present invention without showing the housing thereof. As shown, the motor in the third embodiment is generally structurally similar to the second embodiment, except for a first rotary oil seal 71 and a second rotary oil seal 72 that are further mounted around the first and the second end 32, 33 of the shaft 3, respectively.

Figure 11:
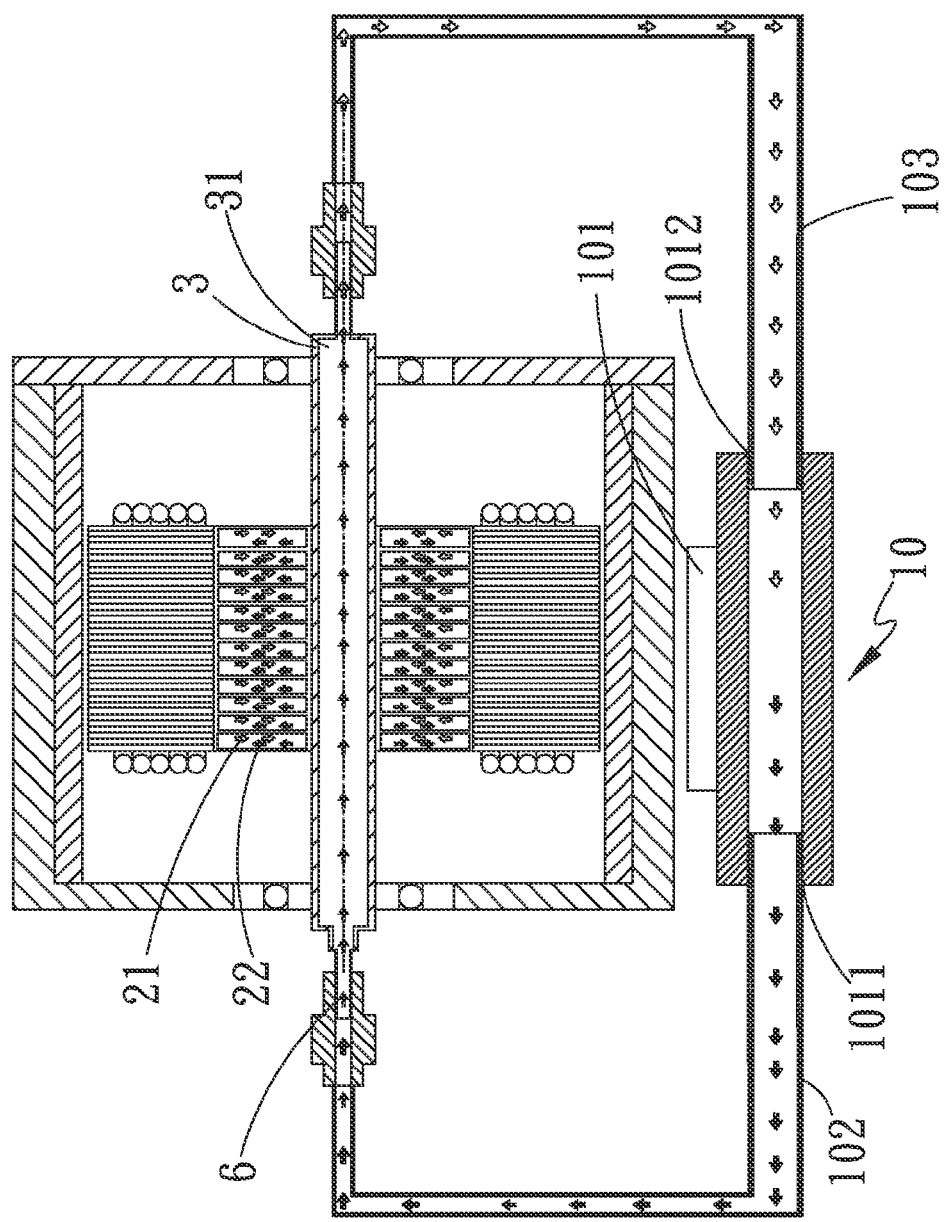
FIG. 11 is an assembled longitudinal sectional view of a fourth embodiment of the motor with centrifugal heat dissipation device according to the present invention.

Please refer to FIG. 11 that is an assembled longitudinal sectional view of a fourth embodiment of the motor according to the present invention. As shown, the motor in the fourth embodiment is generally structurally similar to the third embodiment, except for a pressure device 10 that is further connected to the shaft 3. The pressure device 10 is a pump formed of a pressure unit 101, a first pipe 102, and a second pipe 103. The pressure unit 101 has an outlet 1011 and an inlet 1012, which are connected to the two ends of the shaft 3 via the first pipe 102 and the second pipe 103, respectively.

Figure 12:
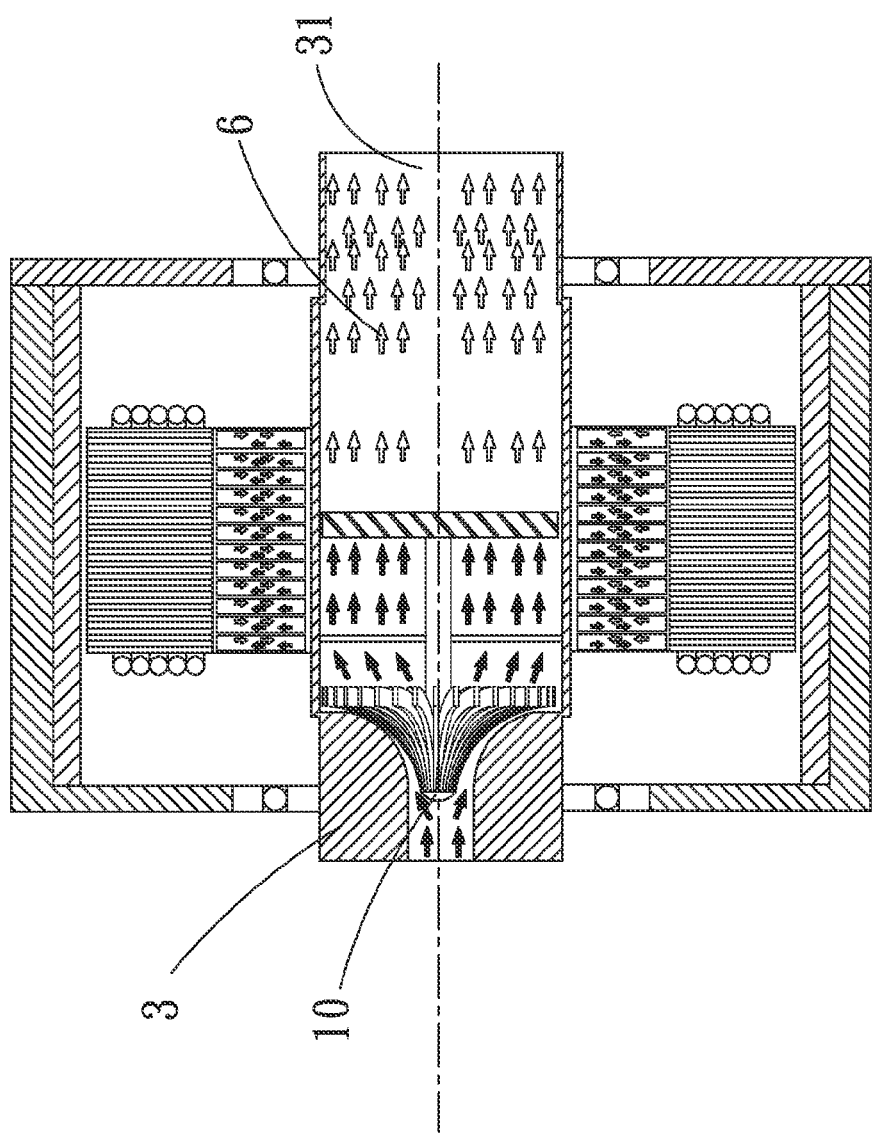
FIG. 12 is an assembled longitudinal sectional view of a fifth embodiment of the motor with centrifugal heat dissipation device according to the present invention.

Please refer to FIG. 12 that is an assembled longitudinal sectional view of a fifth embodiment of the motor according to the present invention. As shown, the motor in the fifth embodiment is generally structurally similar to the third embodiment, except for a pressure device 10 that is further mounted to the hollow space 31 of the shaft 3. The pressure device 10 is a turbine blade assembly being able to guide a cooling fluid 6 (i.e. ambient air) into the hollow space 31 when the shaft 3 is rotating, so as to remove heat from the rotating shaft 3 to achieve the purpose of cooling the motor.

Figure 13:
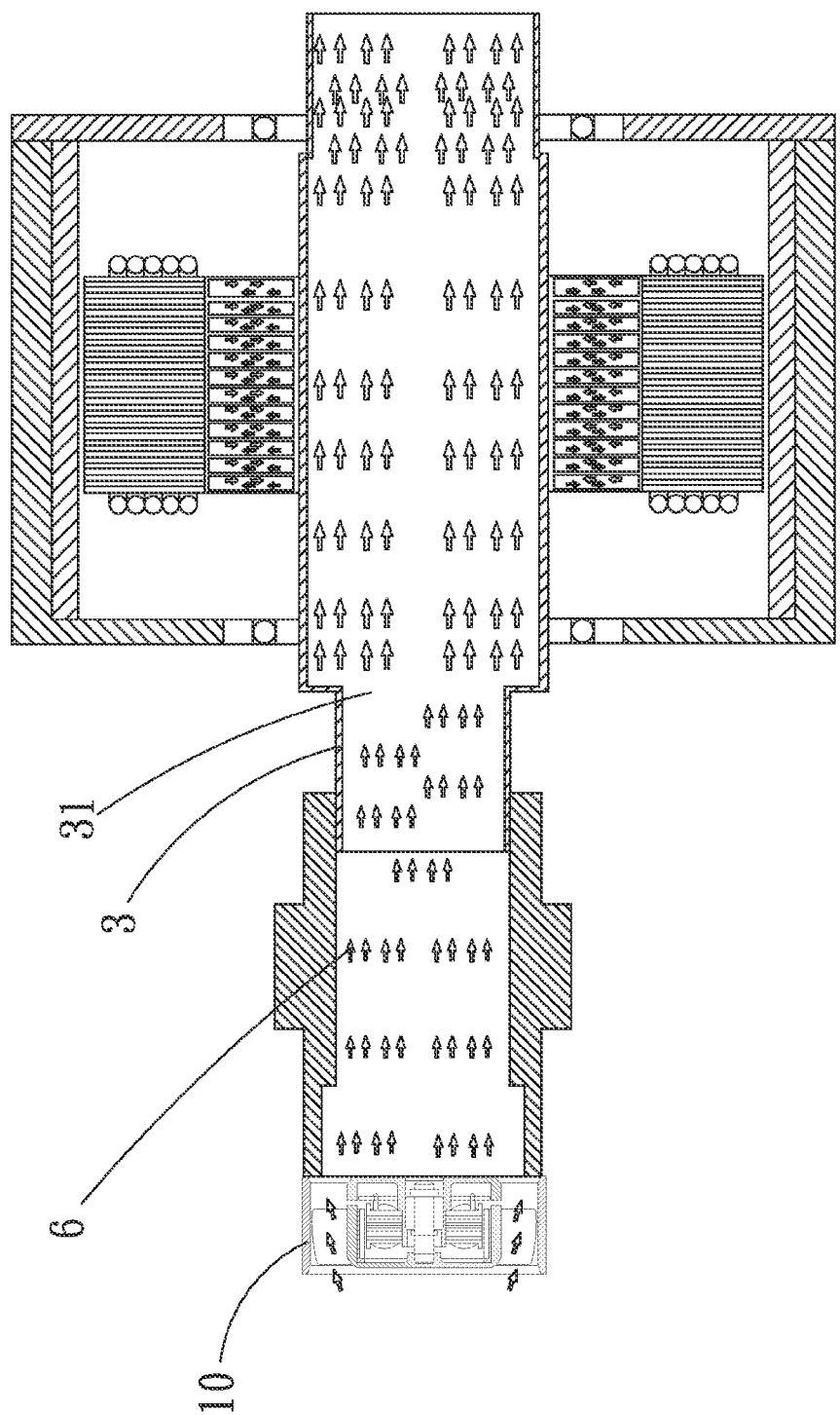
FIG. 13 is an assembled longitudinal sectional view of a sixth embodiment of the motor with centrifugal heat dissipation device according to the present invention.

FIG. 13 is an assembled longitudinal sectional view of a sixth embodiment of the motor according to the present invention. As shown, the motor in the sixth embodiment is generally structurally similar to the second embodiment, except for a pressure device 10 that is further connected to one end of the shaft 3. The pressure device 10 is a fan being able to guide a cooling fluid 6 (i.e. ambient air) into the hollow space 31 of the shaft 3 when the shaft 3 is rotating, so as to remove heat from the rotating shaft 3 to achieve the purpose of cooling the motor.

Figure 14:
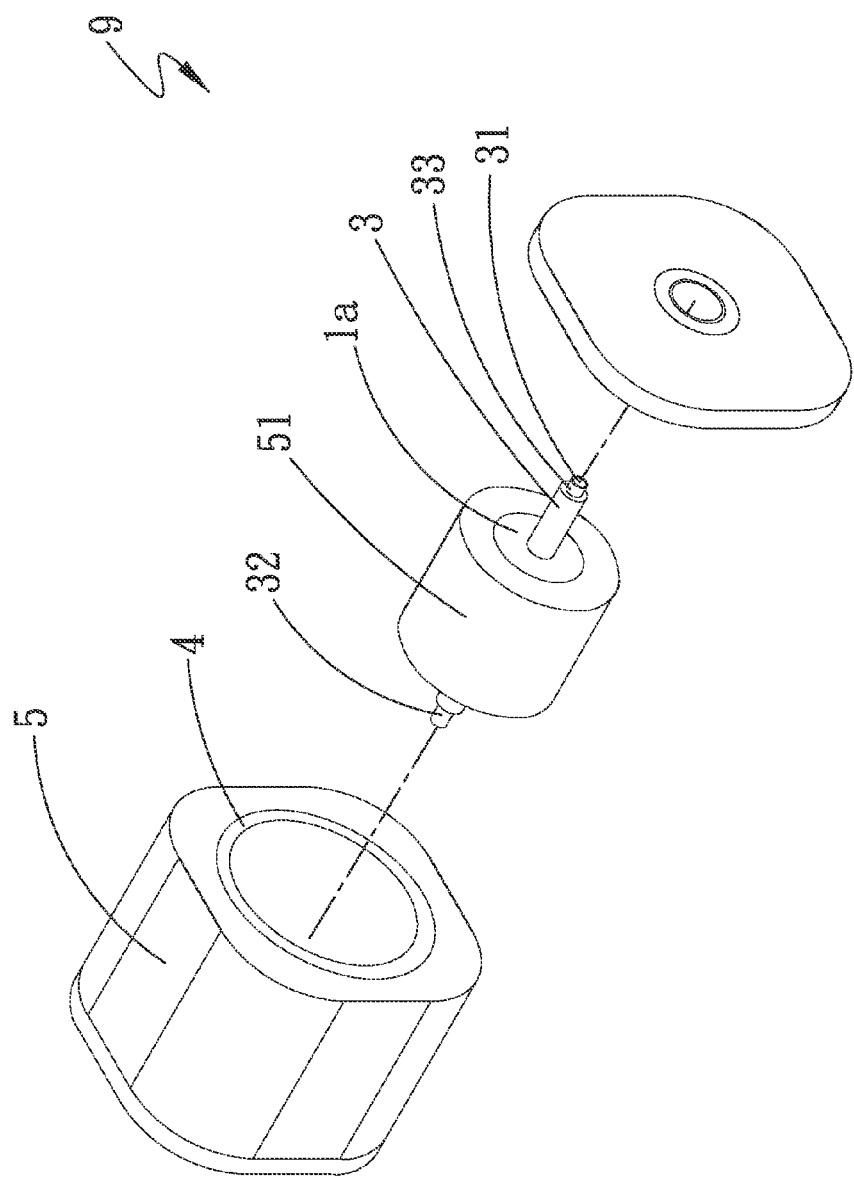
FIG. 14 is an exploded perspective view of a seventh embodiment of the motor with centrifugal heat dissipation device according to the present invention.
Figure 15:
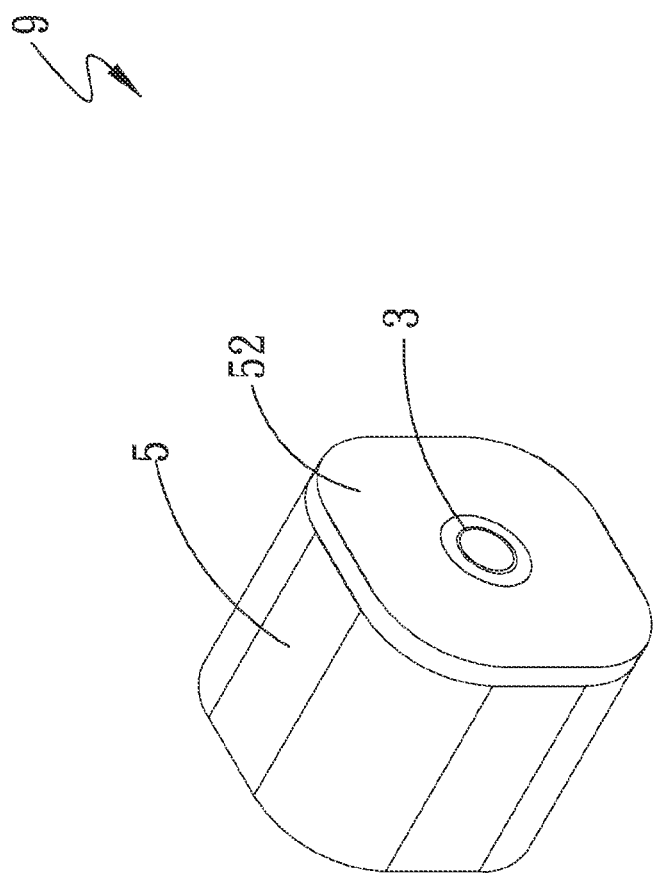
FIG. 15 is an assembled view of FIG. 14.
Figure 16:
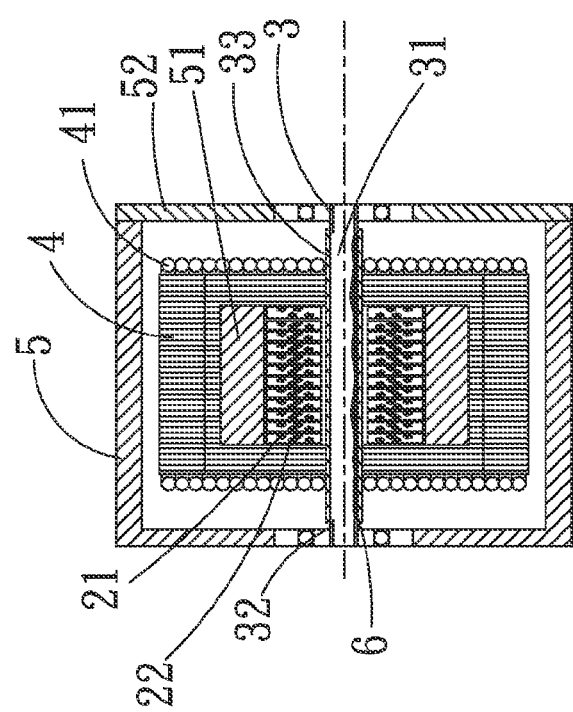
FIG. 16 is an assembled longitudinal sectional view of the seventh embodiment of the motor with centrifugal heat dissipation device according to the present invention.

Please refer to FIGS. 14, 15 and 16, which are respectively an exploded perspective view, an assembled perspective views, and an assembled longitudinal sectional view of a seventh embodiment of the motor 9 with centrifugal heat dissipation device according to the present invention. As shown, the motor 9 with centrifugal heat dissipation device in the seventh embodiment thereof includes at least one shaft 3, a centrifugal heat dissipation device 1a, at least one magnetic member 51, and a housing 5.

The shaft 3 internally defines a hollow space 31, and has a first end 32 and a second end 33. The first and second ends 32, 33 are communicable with the hollow space 31.

The centrifugal heat dissipation device 1a includes a main body 1, which has a shaft hole 11, a heat-absorption zone 12, and a heat-transfer zone 13 as that shown in FIG. 1. The heat-transfer zone 13 has a radially inner side connected to the shaft hole 11 and a radially outer side connected to the heat-absorption zone 12. The shaft hole 11 axially extends through the main body 1, and the shaft 3 is fitted in the shaft hole 11.

The magnetic member 51 is externally fitted around the main body 1 of the centrifugal heat dissipation device 1a.

The housing 5 is internally provided with a plurality of silicon steel sheets 4, which are located corresponding to but spaced from the magnetic member 51 when the centrifugal heat dissipation device 1a and the shaft 3 are mounted in the housing 5. The housing 5 has at least one end being an open end, to which a cap 52 is connected to close the housing 5. In a preferred embodiment, the magnetic member 51 is a magnet.

A cooling fluid 6 is filled in the hollow space 31 of the shaft 3. The cooling fluid 6 may be air, oil, or water.

The silicon steel sheets 4 have a plurality of winding coils 41 externally wound thereon.

Figure 17:
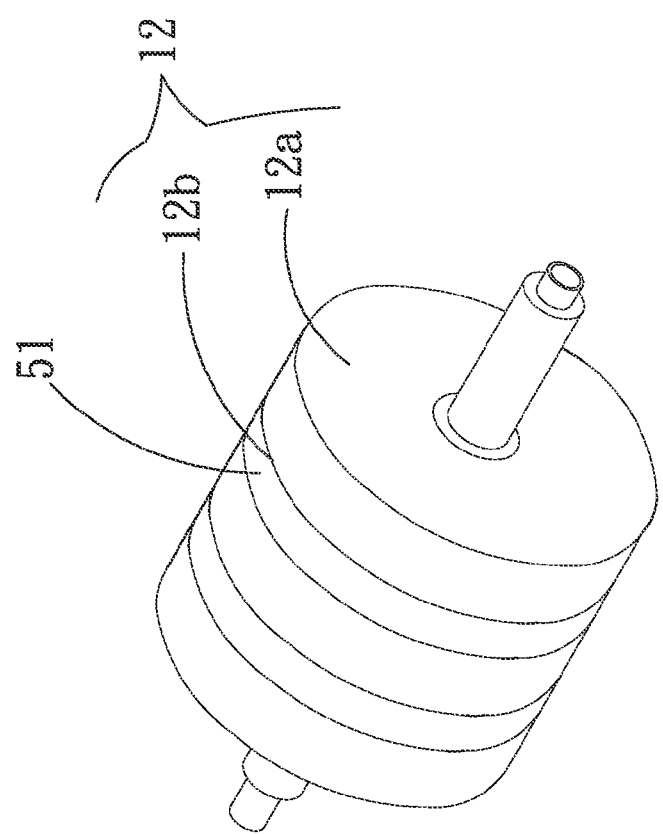
FIG. 17 is an assembled perspective view of an eighth embodiment of the motor with centrifugal heat dissipation device according to the present invention without showing the housing thereof.

FIG. 17 is an assembled perspective view of an eighth embodiment of the motor according to the present invention without showing the housing thereof. As shown, the motor in the eighth embodiment is generally structurally similar to the seventh embodiment, except that the centrifugal heat dissipation device for the eighth embodiment has a heat-absorption zone 12 that is radially outward extended from only a partial axial length of the heat-transfer zone 13 and has a first transverse surface 12a and an opposite second transverse surface 12b, and the magnetic member 51 is in contact with the first or the second transverse surface 12a, 12b of the heat-absorption zone 12.

Figure 18:
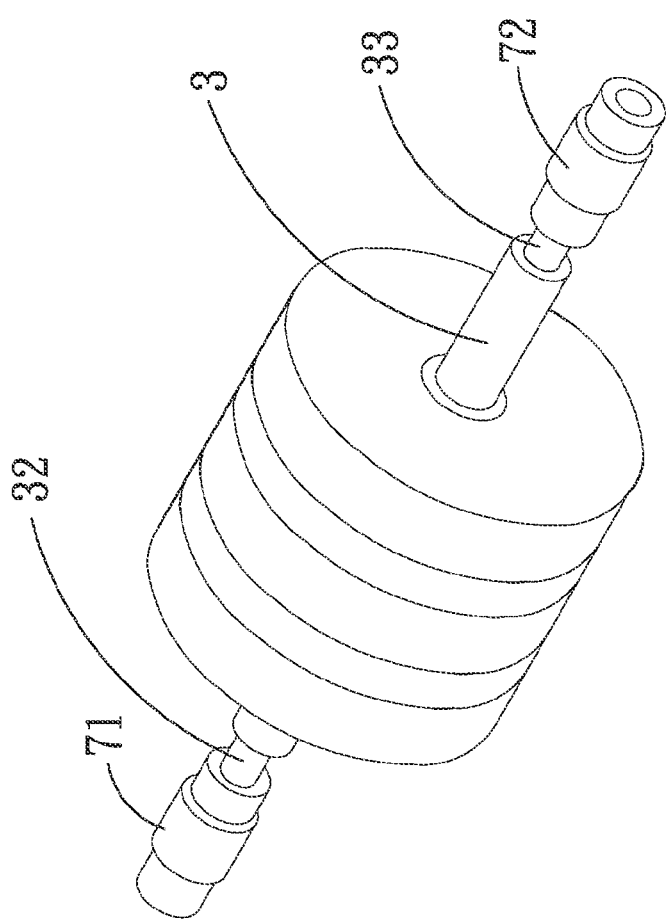
FIG. 18 is an assembled perspective view of a ninth embodiment of the motor with centrifugal heat dissipation device according to the present invention without showing the housing thereof.

FIG. 18 is an assembled perspective view of a ninth embodiment of the motor according to the present invention without showing the housing thereof. As shown, the motor in the ninth embodiment is generally structurally similar to the eighth embodiment, except for a first rotary oil seal 71 and a second rotary oil seal 72 that are further mounted around the first and the second end 32, 33 of the shaft 3, respectively.

Figure 19:
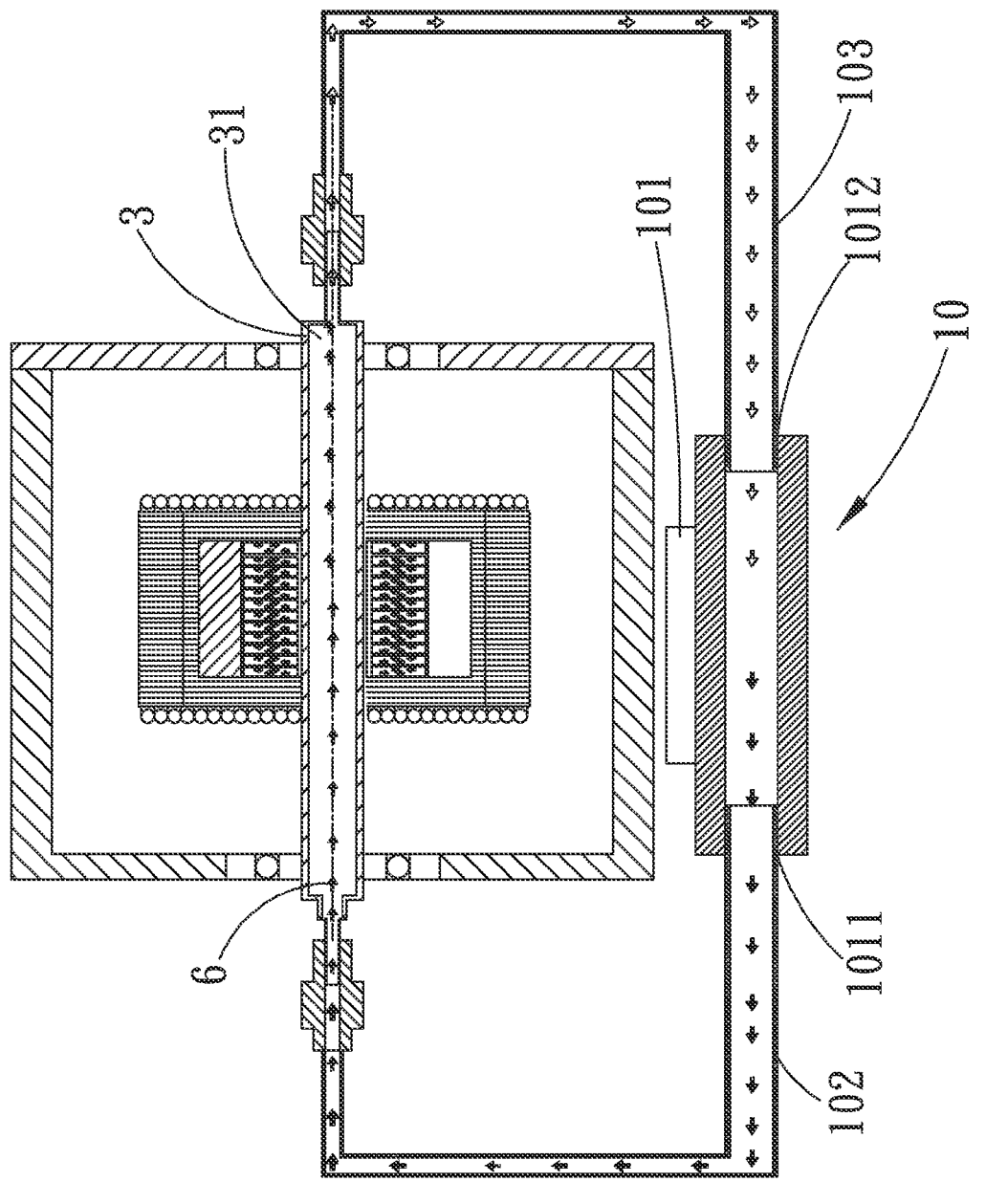
FIG. 19 is an assembled longitudinal sectional view of a tenth embodiment of the motor with centrifugal heat dissipation device according to the present invention.

Please refer to FIG. 19 that is an assembled longitudinal sectional view of a tenth embodiment of the motor according to the present invention. As shown, the motor in the tenth embodiment is generally structurally similar to the ninth embodiment, except for a pressure device 10 that is further connected to the shaft 3. The pressure device 10 is a pump formed of a pressure unit 101, a first pipe 102, and a second pipe 103. The pressure unit 101 has an outlet 1011 and an inlet 1012, which are connected to the two ends of the shaft 3 via the first pipe 102 and the second pipe 103, respectively.

Figure 20:
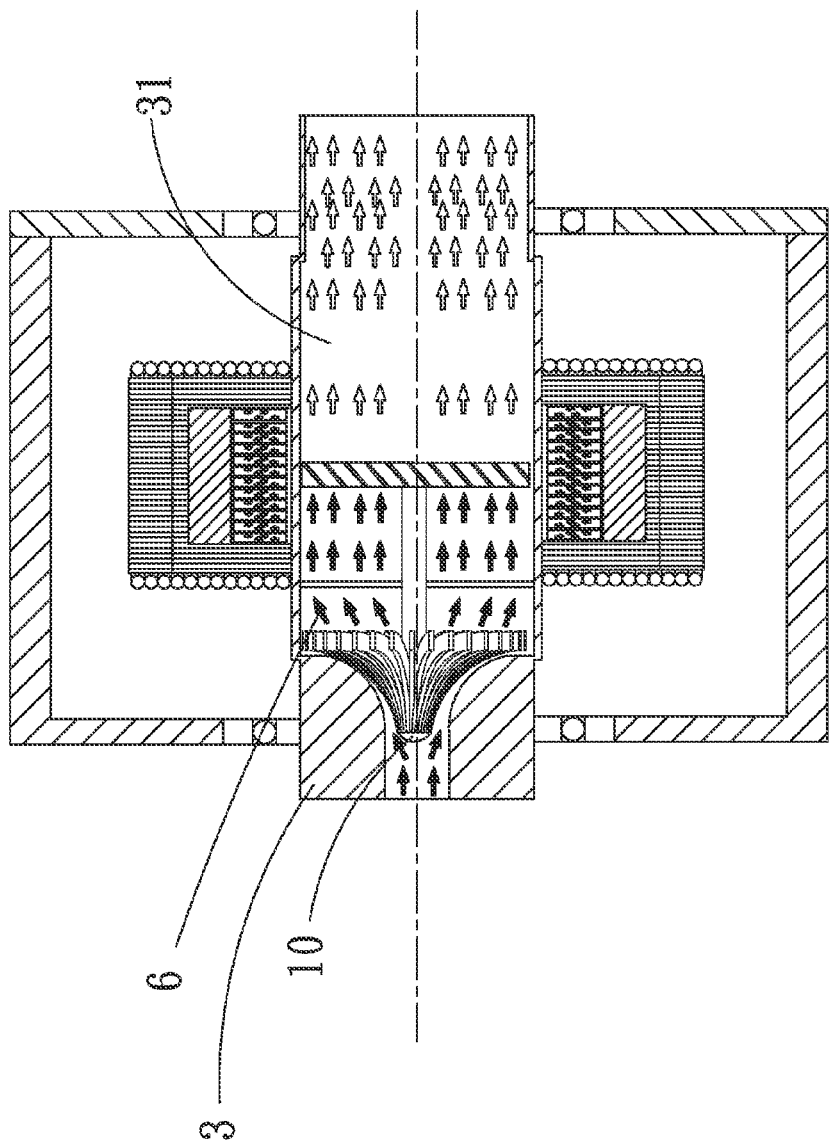
FIG. 20 is an assembled longitudinal sectional view of an eleventh embodiment of the motor with centrifugal heat dissipation device according to the present invention.

Please refer to FIG. 20 that is an assembled longitudinal sectional view of an eleventh embodiment of the motor according to the present invention. As shown, the motor in the eleventh embodiment is generally structurally similar to the seventh embodiment, except for a pressure device 10 that is further mounted to the hollow space 31 of the shaft 3. The pressure device 10 is a turbine blade assembly being able to guide a cooling fluid 6 (i.e. ambient air) into the hollow space 31 when the shaft 3 is rotating, so as to remove heat from the rotating shaft 3 to achieve the purpose of cooling the motor.

Figure 21:
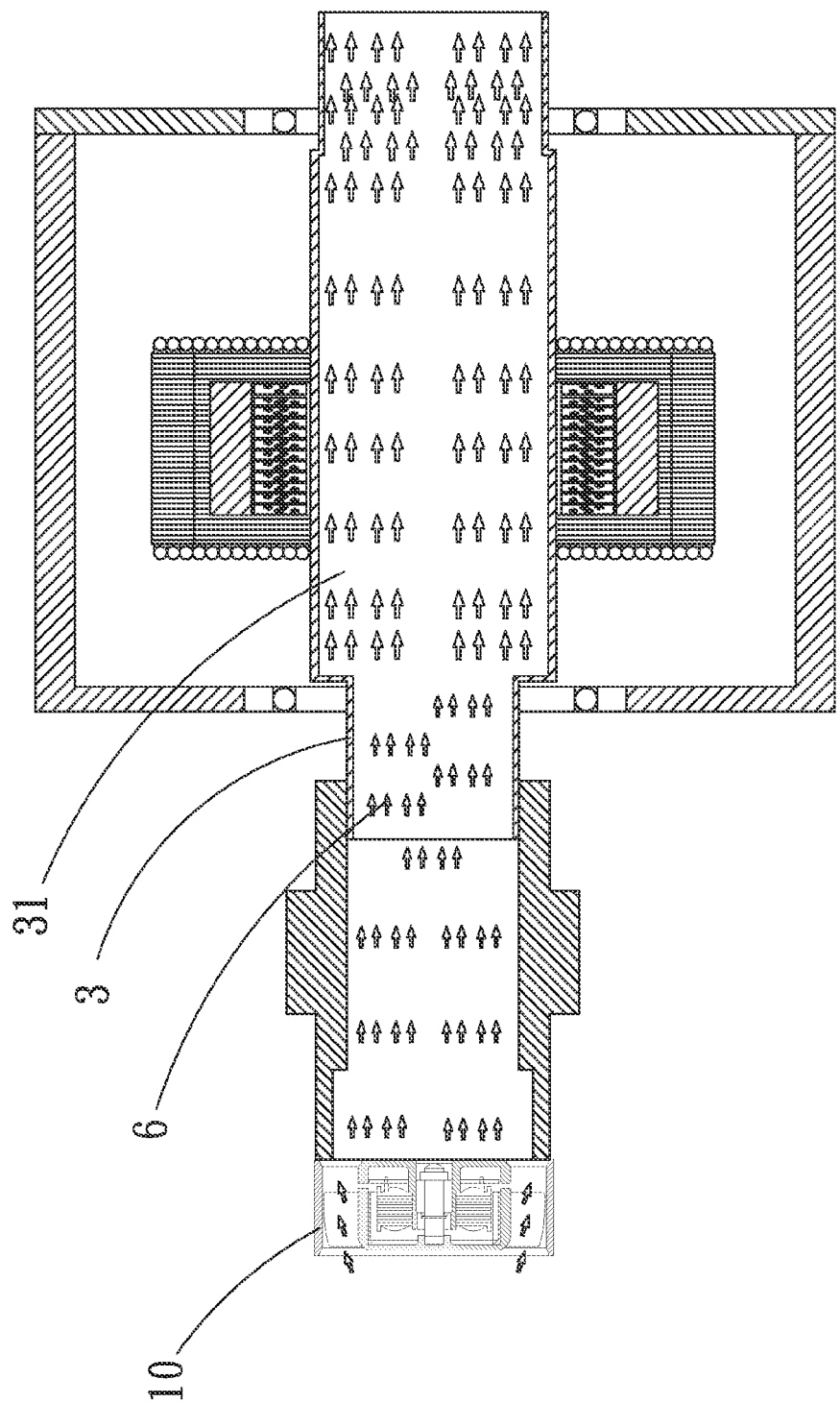
FIG. 21 is an assembled longitudinal sectional view of a twelfth embodiment of the motor with centrifugal heat dissipation device according to the present invention.

FIG. 21 is an assembled longitudinal sectional view of a twelfth embodiment of the motor according to the present invention. As shown, the motor in the twelfth embodiment is generally structurally similar to the ninth embodiment, except for a pressure device 10 that is further connected to one end of the shaft 3. The pressure device 10 is a fan being able to forcedly guide a cooling fluid 6 (i.e. ambient air) into the hollow space 31 of the shaft 3 when the shaft 3 is rotating, so as to remove heat from the rotating shaft 3 to achieve the purpose of cooling the motor.

In the previous eighth to twelfth embodiments, the cooling fluid 6 filled in the hollow space 31 of the shaft 3 may also be air, oil, a refrigerant, or water.

Please refer to FIGS. 1 to 21. According to the embodiments of the present invention, the centrifugal heat dissipation device 1a is a thermosiphon plate. The centrifugal heat dissipation device 1a is internally in a vacuum low-pressure state and filled with a working fluid 2. The working fluid 2 absorbs the heat transferred to the centrifugal heat dissipation device 1a, so that the working fluid 2 in the centrifugal heat dissipation device 1a is vaporized or boiled. In other words, the working fluid 2 absorbs sufficient latent heat of evaporation and is transformed into a vapor-phase working fluid 21. The vapor-phase working fluid 21 is subject to a lower radially outward centrifugal force compared to a liquid-phase working fluid 22. The centrifugal force would guide the vapor-phase working fluid 21 toward a rotating center, i.e. toward a center of the shaft 3, while guiding the liquid-phase working fluid 22 toward the radially outer side of the heat-absorption zone 12 to thereby achieve a vapor-liquid separating function. Therefore, the centrifugal heat dissipation device 1a provides better heat transfer efficiency than conventional heat pipes and vapor chambers that guide the working fluid only via the force of gravity.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A motor with centrifugal heat dissipation device, comprising:
   at least one shaft internally defining a hollow space and having a first end and an opposite second end; and the first and second ends being communicable with the hollow space;
   a centrifugal heat dissipation device including a main body having a shaft hole, a heat-absorption zone, and a heat-transfer zone; the heat-transfer zone having a radially outer side connected to the heat-absorption zone and a radially inner side connected to the shaft hole; the shaft hole axially extending through the main body, and the shaft being fitted in the shaft hole;
   at least one magnetic member being externally fitted around the main body of the centrifugal heat dissipation device; and
   a housing being internally provided with a plurality of silicon steel sheets, which are located corresponding to but spaced from the centrifugal heat dissipation device when the centrifugal heat dissipation device and the shaft are mounted in the housing; and the housing having at least one end being an open end, to which a cap is connected to close the housing, wherein the heat-absorption zone is radially outward extended from only a partial axial length of the heat-transfer zone, and defines a first transverse surface and an opposite second transverse surface; and the magnetic member being in contact with one of the first and the second transverse surface of the heat-absorption zone.

2. The motor with centrifugal heat dissipation device as claimed in claim 1, wherein the first and the second end of the shaft are connected to a first and a second rotary oil seal, respectively.

3. The motor with centrifugal heat dissipation device as claimed in claim 1, wherein the hollow space of the shaft is filled with a cooling fluid, and the cooling fluid being selected from the group consisting of air, oil, and water.

4. The motor with centrifugal heat dissipation device as claimed in claim 1, wherein the silicon steel sheets have a plurality of winding coils externally wound thereon.

5. The motor with centrifugal heat dissipation device as claimed in claim 1, wherein the magnetic member is a magnet.

6. The motor with centrifugal heat dissipation device as claimed in claim 1, further comprising a pressure device connected to the shaft; the pressure device being a pump and formed of a pressure unit, a first pipe and a second pipe; the pressure unit having an outlet and an inlet, which are connected to the two ends of the shaft via the first and the second pipe, respectively.

7. The motor with centrifugal heat dissipation device as claimed in claim 1, further comprising a pressure device mounted to the hollow space of the shaft, and the pressure device being a turbine blade assembly.

8. The motor with centrifugal heat dissipation device as claimed in claim 1, further comprising a pressure device connected to one end of the shaft, and the pressure device being a fan.

* * * * *